US010296977B2

(12) United States Patent
Chevrette

(10) Patent No.: US 10,296,977 B2
(45) Date of Patent: May 21, 2019

(54) COMPUTER-IMPLEMENTED METHOD AND SYSTEM FOR REPORTING A CONFIDENCE SCORE IN RELATION TO A VEHICLE EQUIPPED WITH A WIRELESS-ENABLED USAGE REPORTING DEVICE

(75) Inventor: Guy Chevrette, Montreal (CA)

(73) Assignee: IMETRIK TECHNOLOGIES INC., Montreal (CA)

( * ) Notice: Subject to any disclaimer, the term of this patent is extended or adjusted under 35 U.S.C. 154(b) by 436 days.

(21) Appl. No.: 13/352,033

(22) Filed: Jan. 17, 2012

(65) Prior Publication Data

US 2013/0018677 A1 Jan. 17, 2013

Related U.S. Application Data

(60) Provisional application No. 61/433,389, filed on Jan. 17, 2011.

(51) Int. Cl.
G06Q 40/08 (2012.01)
G07C 5/00 (2006.01)

(52) U.S. Cl.
CPC ............. *G06Q 40/08* (2013.01); *G07C 5/008* (2013.01)

(58) Field of Classification Search
CPC .................................................... G06Q 40/08
(Continued)

(56) References Cited

U.S. PATENT DOCUMENTS 6,868,386 B1 * 3/2005 Henderson et al. .............. 705/4
7,720,731 B1 5/2010 Ickowicz
(Continued)

FOREIGN PATENT DOCUMENTS

CA 2337780 A1 10/2001
WO 2010062899 A1 6/2010

OTHER PUBLICATIONS

The International Searching Authority, Notification of Transmittal of the International Search Report and the Written Opinion of the International Searching Authority, dated May 4, 2012, 1 page, Canada.
(Continued)

*Primary Examiner* — Kirsten S Apple
*Assistant Examiner* — Martin A Gottschalk
(74) *Attorney, Agent, or Firm* — Hankin Patent Law, APC; Kevin Schraven; Anooj Patel

(57) ABSTRACT

A computer-implemented method provides information about a financed, leased or insured vehicle having an onboard wireless-enabled usage reporting device for computing a risk associated with a financing, leasing or insurance obligation. The method entails receiving data from a remote computer to set parameters to be used by the device installed in the vehicle to measure real-time vehicle usage, computing on the device a confidence score based on the parameters and storing the confidence score in the device, the confidence score being indicative of a risk associated with the financing, leasing or insurance obligation of the vehicle, transferring the confidence score or information relating to the confidence score from the device to the remote computer in response to a command from the remote computer or automatically based on a predefined criterion, and displaying the confidence score to indicate the risk associated with the financing, leasing or insurance obligation.

10 Claims, 4 Drawing Sheets

(58) Field of Classification Search
USPC .......................................................... 705/4
See application file for complete search history.

(56) References Cited

U.S. PATENT DOCUMENTS

| | | |
|---|---|---|
| 8,086,523 B1 | 12/2011 | Palmer |
| 2001/0056544 A1* | 12/2001 | Walker ..................... 713/200 |
| 2002/0111725 A1* | 8/2002 | Burge ......................... 701/29 |
| 2003/0074311 A1* | 4/2003 | Saylors et al. ............... 705/39 |
| 2003/0204473 A1* | 10/2003 | Schulman .................... 705/64 |
| 2004/0153362 A1 | 8/2004 | Bauer |
| 2004/0260557 A1 | 12/2004 | Tremiti |
| 2005/0096945 A1* | 5/2005 | Wharton, III ................. 705/4 |
| 2007/0027726 A1 | 2/2007 | Warren |
| 2007/0082614 A1* | 4/2007 | Mock ........................ 455/41.2 |
| 2007/0282783 A1* | 12/2007 | Singh ........................... 707/1 |
| 2008/0238690 A1* | 10/2008 | Plant ................... B60R 25/241 340/573.1 |
| 2009/0058685 A1* | 3/2009 | McCall ................ G08G 1/005 340/995.24 |
| 2009/0088924 A1* | 4/2009 | Coffee et al. ................. 701/33 |
| 2009/0157566 A1* | 6/2009 | Grush ........................ 705/400 |
| 2010/0030586 A1* | 2/2010 | Taylor et al. ................... 705/4 |
| 2011/0022443 A1* | 1/2011 | Partridge et al. .............. 705/10 |
| 2011/0112870 A1* | 5/2011 | Berg ..................... G06Q 40/08 705/4 |
| 2011/0137684 A1* | 6/2011 | Peak .................... G06Q 30/02 705/4 |
| 2011/0175754 A1* | 7/2011 | Karpinsky .................... 340/963 |
| 2012/0066005 A1* | 3/2012 | Stewart ............. G06Q 30/0282 705/4 |
| 2012/0242469 A1* | 9/2012 | Morgan et al. ......... 340/426.11 |
| 2012/0246000 A1* | 9/2012 | Yarvis et al. ............... 705/14.53 |
| 2013/0073114 A1* | 3/2013 | Nemat-Nasser et al. ......... 701/1 |

OTHER PUBLICATIONS

The International Searching Authority, Written Opinion, dated May 4, 2012, 8 pages, Canada.
The International Searching Authority, International Search Report, dated May 4, 2012, 4 pages, Canada.
Extended European Search Report of the European Patent Office, dated Apr. 7, 2014, European Patent Office.

* cited by examiner

COMPUTER-IMPLEMENTED METHOD AND SYSTEM FOR REPORTING A CONFIDENCE SCORE IN RELATION TO A VEHICLE EQUIPPED WITH A WIRELESS-ENABLED USAGE REPORTING DEVICE

CROSS-REFERENCE TO RELATED APPLICATIONS

This application claims priority from U.S. Provisional Patent Application Ser. No. 61/433,389 entitled COMPUTER-BASED METHOD OF FINANCING AND TRANSFERRING OWNERSHIP OF AND FINANCIAL OBLIGATION FOR PAYMENT DEVICES, which was filed Jan. 17, 2011.

TECHNICAL FIELD

The present invention relates generally to wireless-enabled usage reporting devices installed in vehicles and, more particularly, to the use of such wireless-enabled usage reporting devices to provide information about a risk associated with a financing, leasing or insurance obligation associated with the vehicle.

BACKGROUND

The industry term for a device that is attached to a vehicle, by a vehicle dealer, which allows the dealer or financer to track or disable the vehicle should the person to whom the dealer loaned, leased, or sold the vehicle, using financing, fail to keep up with payments, is "payment device" or "wireless-enabled usage reporting device."

The industry term for finance companies that specialize in the purchase of automobile loans from automobile dealers is "portfolio acquisition". Some portfolio acquisition companies also lend to automobile dealers against the future payments due on the dealer's loans, a practice that is known in the industry as "payment stream".

Dealers do not use wireless-enabled usage reporting devices in the necessary high volume levels to make apparent the quality differences between the various wireless-enabled usage reporting devices. This has incentivized wireless-enabled usage reporting device manufacturers to produce the lowest cost wireless-enabled usage reporting device possible rather than produce a high-quality and collection-efficient wireless-enabled usage reporting device. Having a low-cost wireless-enabled usage reporting device is the driving concern for most dealers. This has created a race to the bottom among the wireless-enabled usage reporting device vendors and has driven profit margins to almost unsustainably low levels.

Further, portfolio acquisition companies, who would greatly benefit from a strategy employing the right wireless-enabled usage reporting device technology, have little control over the technology employed by their dealer clients and, therefore, have been unable to fully capitalize on greater usage of the devices.

Thus, what is needed is a computer-based "pay as you go" solution for vehicle dealers and finance companies that allows for the efficient transfer of vehicles and their wireless-enabled usage reporting devices along with any device-related financial obligations within a preferred lender network in conjunction with a portfolio acquisition or payment stream transaction.

More generally, what is needed is a new technology enabling financing, leasing and insurance companies to evaluate the risk associated with a particular vehicle financing obligation, leasing obligation or insurance obligation while respecting the privacy of the vehicle user.

SUMMARY

In general, the present invention provides a computer-implemented method, system and computer-readable medium for gathering information about a financed, lease or insured vehicle using an onboard wireless-enabled usage reporting device that collects data, computes a confidence score and transmits this confidence score to a remote computer. This information about the financial risk associated with each vehicle may be used for transferring a financial obligation from one entity to another, i.e. from one creditor to another, or for adjusting the leasing rate or insurance rate based on the actual vehicle usage.

One aspect of the present invention is thus a computer-implemented method of providing information about a financed, leased or insured vehicle having an onboard wireless-enabled usage reporting device for computing a risk associated with a financing, leasing or insurance obligation. The method entails receiving data from a remote computer to set parameters to be used by the wireless-enabled usage reporting device installed in the vehicle to measure real-time vehicle usage, computing on the wireless-enabled usage reporting device a confidence score based on the parameters received from the remote computer and storing the confidence score in the wireless-enabled usage reporting device, the confidence score being indicative of a risk associated with the financing, leasing or insurance obligation of the vehicle, transferring the confidence score or information relating to the confidence score from the wireless-enabled usage reporting device to the remote computer in response to a command from the remote computer or automatically based on a predefined criterion, and displaying the confidence score or the information relating to the confidence score to indicate the risk associated with the financing, leasing or insurance obligation.

Another aspect of the present invention is a system comprising a plurality of wireless-enabled usage reporting devices installed in vehicles, each wireless-enabled usage reporting device comprising a vehicular data port for receiving data about the vehicle based on parameters received via a data network from a remote computer, a global navigation satellite system (GNSS) location sensor for determining a current position of the vehicle as one element of the data, a processor for processing the data to compute a confidence score based on the data, the confidence score being indicative of a risk associated with the financing, leasing or insurance obligation, a memory for storing the confidence score, and a wireless transceiver for transmitting the confidence score to the remote computer. The remote computer comprises a memory operatively coupled to a processor for displaying the confidence score or information based on the confidence score to indicate the risk associated with the financing, leasing or insurance obligation.

Yet another aspect of the present invention is a computer-readable medium comprising code which when stored in a memory and executed by a processor of an onboard wireless-enabled usage reporting device causes the onboard wireless-enabled usage reporting device to perform acts of receiving data from a remote computer to set parameters to be used by the wireless-enabled usage reporting device installed in the vehicle to measure real-time vehicle usage, computing on the wireless-enabled usage reporting device a confidence score based on the parameters received from the remote computer and storing the confidence score in the wireless-enabled usage reporting device, the confidence score being indicative of a risk associated with the financing, leasing or insurance obligation of the vehicle, and transferring the confidence score or information relating to the confidence score from the wireless-enabled usage reporting device to the remote computer.

DETAILED DESCRIPTION

Figure 1:
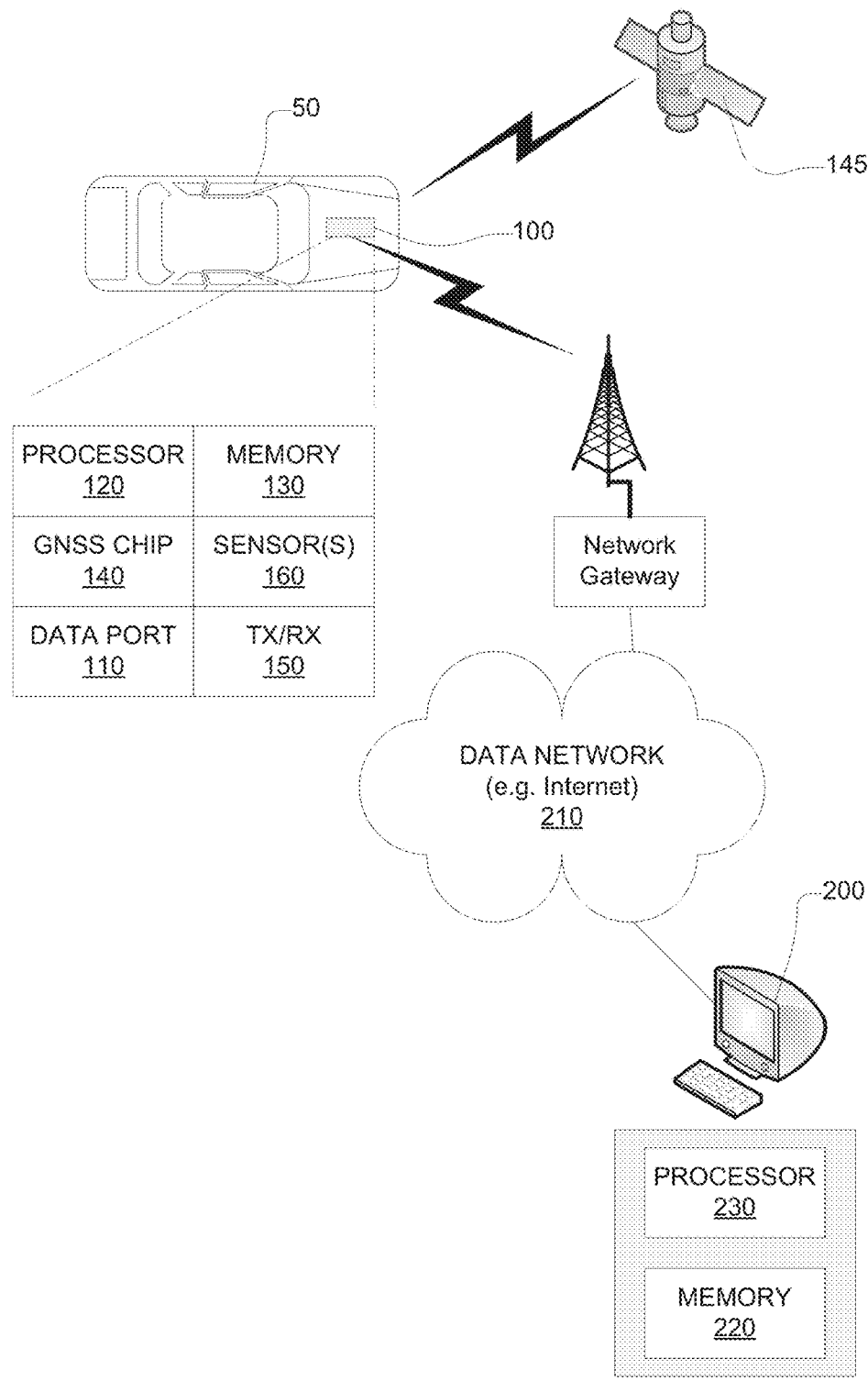
FIG. 1 is a system for providing information about a vehicle using an onboard wireless-enabled usage reporting device that provides a confidence score relating to the vehicle.

In general, the present invention relates generally to a computer-based method and system of using an onboard wireless-enabled usage reporting device to collect vehicle usage data and to compute a confidence score based on this vehicle usage data. The confidence score is stored in the memory of the onboard wireless-enabled usage reporting device for transfer to a remote computer. The confidence score may be used to manage loan servicing and financing of vehicles as well as the transferring of ownership and financial obligation relating to wireless-enabled usage reporting devices that enhance or ensure a borrower's payment for a leased or loaned asset such as a vehicle. One aspect relates to a computer-based method of financing and transferring a device that is attached to a vehicle by a vehicle dealer or financer that allows the dealer or financer to track or disable the vehicle should the person to whom the dealer loaned, leased, or sold the vehicle, using financing, fail to keep up with payments or breach any other contractual terms or conditions of the lease or loan. Other aspects relate to using the confidence score to dynamically adjust a leasing rate (or rental rate) for a vehicle or to dynamically adjust an insurance rate for the vehicle based on vehicle usage and wear while protecting the privacy of the user.

In the following description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

One aspect of the invention is a computer-based "pay as you go" wireless-enabled usage reporting device solution for vehicle dealers and finance companies that allows for financing of the wireless-enabled usage reporting device and then for the transfer of the wireless-enabled usage reporting devices within a preferred lender network in conjunction with a portfolio acquisition or payment stream transaction. The computer-based method of the present invention can be combined with a solution for the capital sources that underpin the "buy here pay here" vehicle sales market, enabling dealers to afford higher quality wireless-enabled usage reporting devices or to reduce capital expenditure in utilizing the technology. The method will also serve to increase the overall demand for wireless-enabled usage reporting devices and improve the efficiency of collections for automobile dealers and finance companies. The computer-based method of financing and transferring wireless-enabled usage reporting devices will also divide the wireless-enabled usage reporting device purchasing cost between multiple parties, thus reducing the barriers to using high quality wireless-enabled usage reporting devices.

Some Key Features of the Method

Some of the key features and aspects of the method will now be described so to provide a more complete understanding of the various embodiments of the present invention.

Preferred Lender Network. By limiting the lender network to a small number of highly valued sources, the computer-based method will incentivize the dealers to do business with the networked lenders (preferred lenders or program participants). In essence, if a dealer sells the vehicle loan, which includes the promise to pay (i.e. the contract) and the collateral (i.e. the vehicle), which has been equipped with the wireless-enabled usage reporting device, in a network using the computer-based method, the wireless-enabled usage reporting device payments go with the device to the acquiring lender. If the dealer sells outside of the network, the dealer is responsible for immediately paying the retail price of the wireless-enabled usage reporting device to the wireless-enabled usage reporting device vendor (or clearinghouse), less any amounts paid to date. This feature will likely result in the networked lenders at least having an opportunity to buy when the dealer is interested in selling and it will serve as a hedge against competition from non-preferred lenders.

Interest-Free Financing. The vehicle dealer will be able to preferably finance and obtain a full feature wireless-enabled usage reporting device, including GNSS location sensor, starter interrupt, and integrated back-up battery, with unlimited usage, for a low-cost inventory stocking flat fee (e.g. $10-100 per wireless-enabled usage reporting device). The wireless-enabled usage reporting device vendor will then invoice the vehicle dealer for a low-cost monthly flat fee (e.g. $1-50 per wireless-enabled usage reporting device) until the note on the wireless-enabled usage reporting device has been paid in full (e.g. usually not to exceed $100-$300). If the note is sold by the dealer to a program lending partner, the payments for the wireless-enabled usage reporting device end for the vehicle dealer. The finance company that is purchasing the receivable, or lending against it, takes on the financial obligation of paying off the wireless-enabled usage reporting device. The computer-based method of financing the wireless-enabled usage reporting devices might result in a reduction of cost for the dealer of, for example, 50%-75% depending on the costs of an alternative wireless-enabled usage reporting device employed and "note seasoning" (i.e. the period up to the point of sale to a finance company that payments are made between the borrower and the vehicle dealer) at the time the note is sold.

Computer-Based Transferring. Lender partners are provided a number of tools under the computer-based system and method to enhance their ability to price risk, originate notes, and maximize the efficiencies within their operation.

This includes an origination tool that reduces the paperwork in the transaction between the vehicle dealer and lender. Another tool is the "confidence score" which rates the accuracy of the borrower's residence and employment data as supplied by the dealer to the finance company, as discussed further below. In consideration for this, lenders participating in the program will pay a onetime transfer fee between, for example, $1-100 and then pick up the monthly payments for the life of the loan at a reduced rate between, for example, $1-50.

Clearinghouse. The computer-based method preferably includes a managing company that serves as a clearinghouse between the dealers and the preferred lenders. The clearinghouse stores the data needed to complete the transaction in an efficient manner while minimizing the risk to the preferred lenders and by providing scoring as opposed to actual location data, protects the privacy of the consumer/borrower, as discussed in detail below.

Automated Loan Data Delivery. The computer-based method also preferably provides loan data export. By combining the loan data export with a document capture and imaging system, the clearinghouse can facilitate the computer-based transfer method that delivers all of the information the acquisition lender needs to purchase a note pool. This will provide significant efficiencies in originations for preferred lenders as well as providing tremendous value to the dealers.

Location-Based Employment and Residence Verification. The computer-based method also includes the ability to verify the employment and residence of a borrower and to include this information with the note to be sold. Using location data from the GPS (or other GNSS) on the wireless-enabled usage reporting device, the computer-based method and system can provide this information to the acquiring lender prior to pool pricing. Having this information will offer the acquiring lender the opportunity to better manage risk while enhancing the speed at which the transaction will be completed. In consideration of privacy concerns, the system will not provide the actual location history of the borrower. Instead, the system or application has an index (known as the "confidence score"), which supplies the preferred lender insight into the location history of the borrowed collateral (or vehicle). If, during regular business hours, the vehicle is at the reported place of employment of the borrower, the system will record this as, for example, a score of 3 within the system. If the vehicle is not at the reported place of employment but is consistently at another location, this will be reported as, for example, a score of 2. If, during regular business hours, the vehicle is at the borrower's reported home address, this will be reported as, for example, a score of 1. Thus, the higher the score is over time, the more likely that the borrower is employed. The confidence score will allow the purchaser to know which notes will pass the verification process prior to providing pricing to the dealer.

Mileage Verification. The mileage of a vehicle is important to acquisition lenders as another indicator of loan performance. Obviously, higher mileage vehicles experience more mechanical issues, which make for a much more difficult note to collect. Traditionally, the lenders only have an estimated mileage of the vehicle based on time and the original mileage at the time of sale. The system will track the actual vehicle mileage and supply the mileage to the preferred partners prior to the sale.

Systems Integration. In developing a close partnership with the major portfolio acquisition organizations, additional value can be provided through integration with the lenders servicing platform software. This integration would allow for wireless-enabled usage reporting device management and loan management within the existing software utilized by the preferred lender. Further, many of the features of the wireless-enabled usage reporting device can be automated such as "Payment Reminders" or "Starter Interrupt" being enabled or disabled based on whether or not the customer has made their payment.

Automated Wireless-Enabled Usage Reporting Device Transfer. Once a note has been sold to a network partner using the computer-based system, the dealer can transfer the corresponding device electronically to the appropriate purchaser using the computer-based system. The dealer selects the device or devices, clicks "transfer" in the web interface and the devices are transferred to the recipients account.

Functionality Summary. Taken together, the above set of features will allow each of the participating finance partners to originate more loans, while minimizing the number of employees required in the labor-intensive loan origination process. Salaries represent approximately 80% of operating overhead at these companies. The present invention will also provide for an enhanced experience to the vehicle dealer resulting in an easier submission process, quicker pricing turnaround times, more accurate underwriting and faster funding.

Other Features:

Lenders will be notified if it appears that the borrower has moved. This is done using the GNSS location information. This will help lenders make sure the monthly billing statement reaches the customer in a timely manner. Additional features might include risk analytics and tracking insurance information of the borrowers.

The computer-based method or program of the present invention is built around the most pressing needs of portfolio acquisition companies. Increasing efficiencies and profits for the lenders is very important.

In providing value to the lenders that support the buy-here, pay-here market, the present invention will significantly drive down the cost of employing the best wireless-enabled usage reporting device technology at the dealer level. This cost reduction will lead to an overall expansion in market size of the wireless-enabled usage reporting device market to the benefit of the clearinghouse and its network lender partners.

Figure 2:
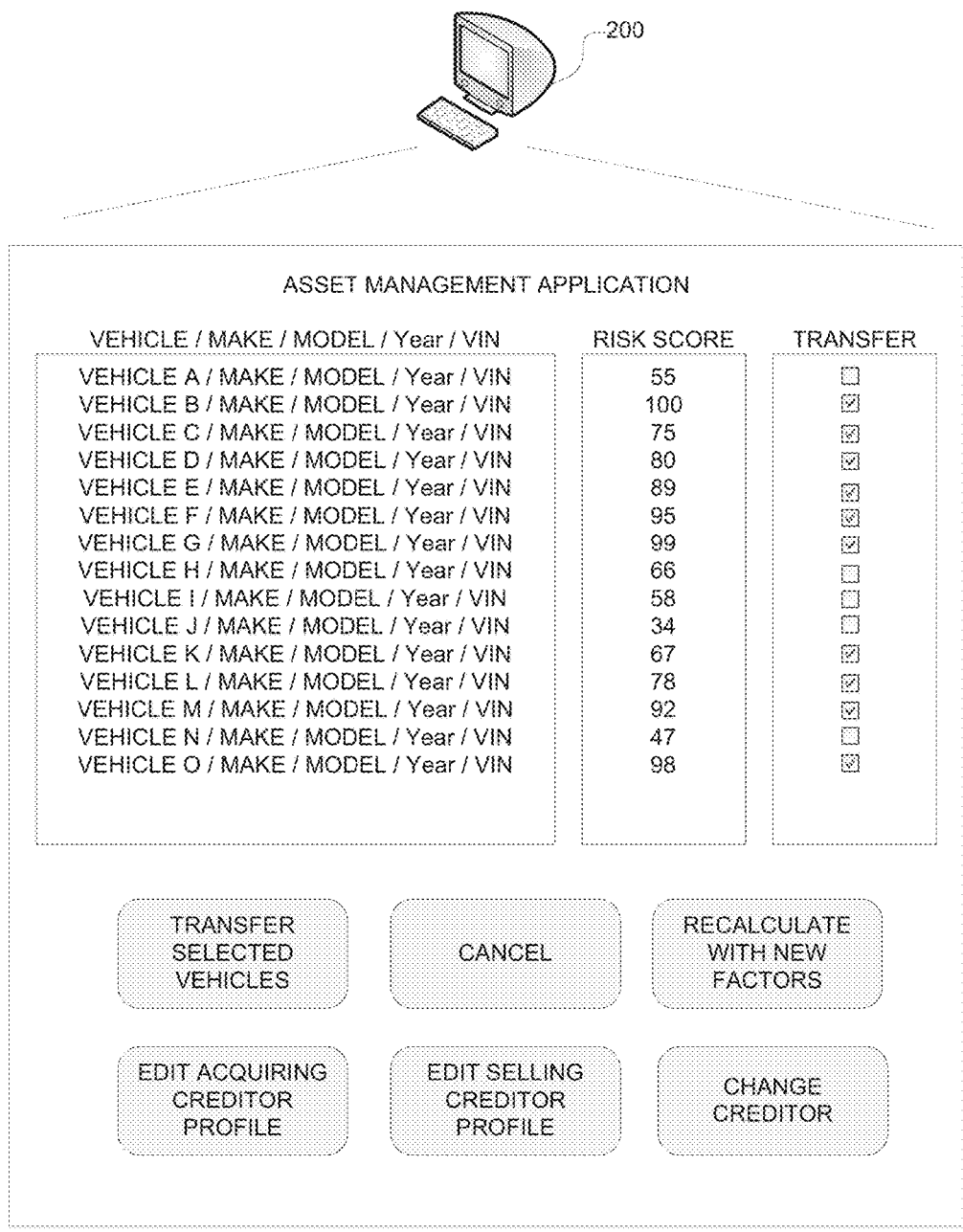
FIG. 2 is a remote computer that displays information related to the confidence score, enables transferring of obligations based on the confidence score, and enables parameters to be defined and sent to the onboard wireless-enabled usage reporting device.
Figure 3:
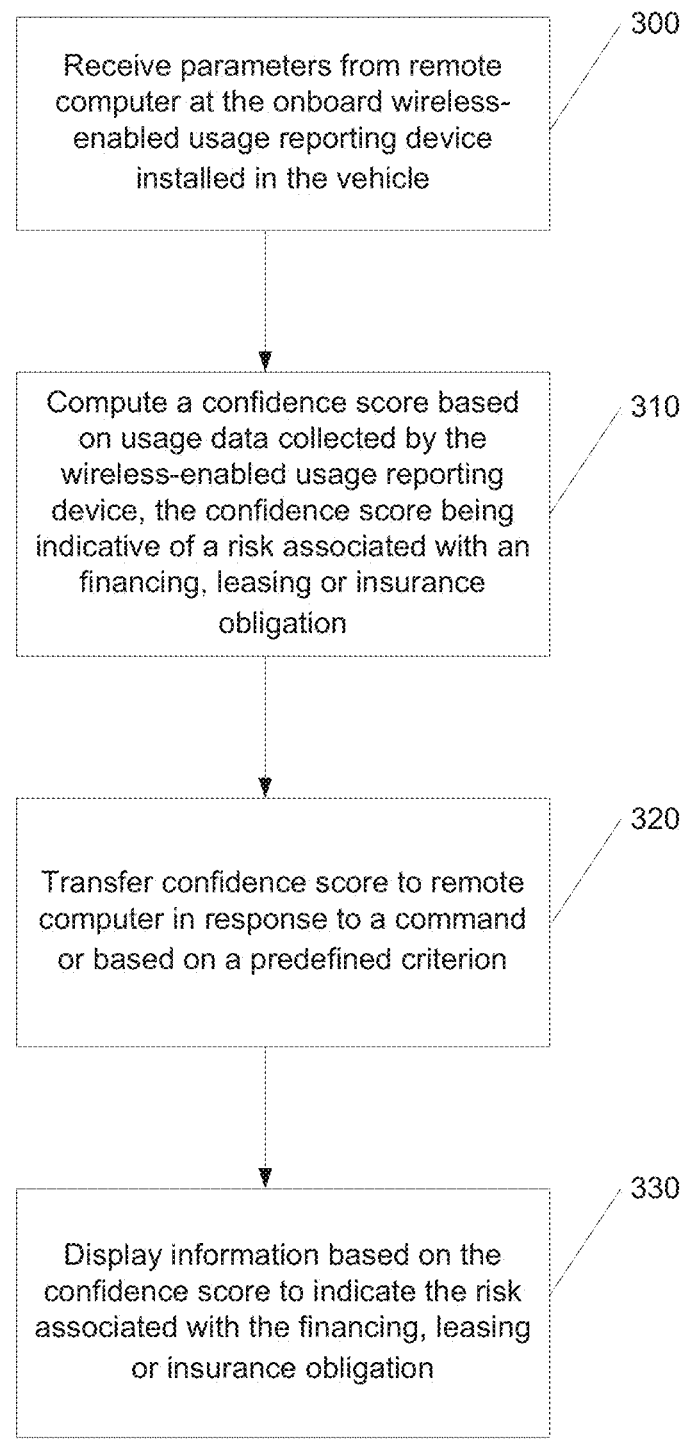
FIG. 3 is a flowchart of a method of providing information about a financed, leased or insured vehicle having an onboard wireless-enabled usage reporting device by computing a confidence score relating to the vehicle and transferring this confidence score to a remote computer.
Figure 4:
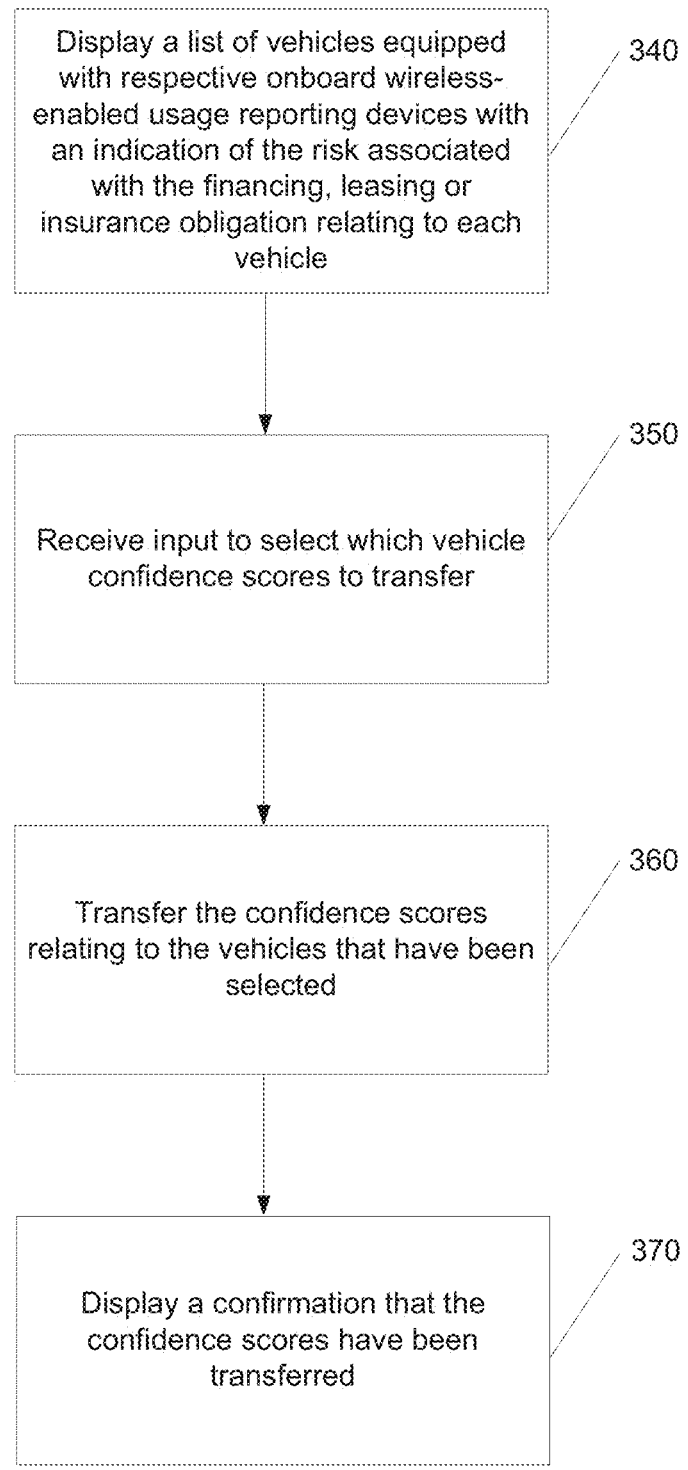
FIG. 4 is a flowchart of a method of displaying and transferring confidence scores relating to financed vehicles.

These various features may thus be integrated into a system such as the one depicted by way of example in FIGS. 1 and 2 or used in computer-implemented methods such as the ones depicted by way of example in FIGS. 3 and 4.

In the system illustrated by way of example in FIG. 1, a plurality of onboard wireless-enabled usage reporting devices, which are designated by reference numeral 100, are installed in respective vehicles 50. Each onboard wireless-enabled usage reporting device 100 (or "payment device") comprises one or more vehicular data ports 110 for receiving data from or about the vehicle, a processor 120 for processing the data to compute a confidence score, a memory 130 for storing the confidence score and other data, a GNSS location sensor 140, e.g. a Global Positioning System (GPS) chip, for determining a current position of the vehicle from signals emitted by a constellation of orbiting navigation satellites 145. The current position data may thus constitute one element of the data that the wireless-enabled usage reporting device collects and processes for calculating the confidence score. In other words, the wireless-enabled usage reporting device has a processor coupled to a memory for computing, calculating or otherwise determining a confidence score based on the data, the confidence score being indicative of a risk associated with the financing, leasing, or insurance obligation.

The confidence score may be computed based on one or multiple risk factors, which may be weighted or not, and which may be configurable by the user of an asset management application executing on the remote computer. Factors may include, but are not limited to, driving behavior (speed, acceleration, deceleration, mileage, times of day or night, length of time driver has been driving, high-risk routes in terms of crime, accidents, bad weather, road construction, current weather conditions, speed at locations where speed limits are known). Factors may also include past driving record, age, gender, type of vehicle, etc. All of these factors (and others) may be used to compute a risk associated with the vehicle. One novel additional factor is to use the wireless-enabled usage reporting device to predict whether the user is at risk of not paying for the vehicle. If the user is still employed, the risk remains lower than if the user becomes unemployed. Using location data to assess that the user is going to work is one innovative way of assessing the risk of non payment of the loan or lease obligations.

The wireless-enabled usage reporting device 100 can use its GNSS location sensor (e.g. GPS chip) for other applications like geo-fencing, vehicle maintenance reminders, fleet tracking, etc. Risk scoring may also take into consideration various factors like geo-fencing violations (e.g. has the vehicle made an unauthorized trip to Mexico). Other factors like ignoring maintenance reminders (demonstrating the user's lack of concern for the vehicle) may also be indicative of risk.

The wireless-enabled usage reporting device 100 further includes a wireless (radiofrequency) transceiver (Tx/Rx) 150 for transmitting the confidence score and other data (e.g. information relating to the confidence score) about the vehicle over the air to a base station tower and through a network gateway of a wireless network (which may implement GSM, LTE, CDMA, etc.) that is connected to the Internet or other data network. Wireless data transfer may be accomplished using GPRS, EDGE, or any other wireless data packet protocol. In addition to the confidence score, the other data transmitted over the air by the wireless-enabled usage reporting device may be raw data, processed data (i.e. new data generated by locally processing the raw data) or a combination of both.

Each wireless-enabled usage reporting device 100 may include one or more sensors 160 for collecting data about the vehicle 50 and its environment. Thus, the wireless-enabled usage reporting device 100 may receive data via the vehicular data port 110 from vehicle subsystems that provide data via the data port of the wireless-enabled usage reporting device or via sensors that collect their own data without being supplied with data by the vehicle subsystems. For example, the data port may receive speed readings from the vehicle subsystem that provides the speed signal to the speedometer. A sensor like an accelerometer may determine the speed of the vehicle independently of the vehicle's own sensors. The accelerometer may also be used to detect acceleration and deceleration behavior (independently of the vehicle speed sensors) or to provide an accident detection signal in the event of a very sharp deceleration indicative of an accident. An accident detection signal may also be generated in response to the deployment of airbags. The accident detection signal may be transmitted by the wireless-enabled usage reporting device to an asset management application on the remote computer for updating the risk score (or confidence score) associated with the vehicle.

Thus, when a transfer of financial obligations occurs, for example, the confidence scores are up to date, so that any recent (e.g. same-day) accidents involving the vehicles being transferred (that have not yet been reported by the users through conventional channels) are properly represented and taken into account at the time of the transfer.

The sensor(s) 160 may be packaged within the casing of the wireless-enabled usage reporting device or they may be remotely disposed through the vehicle and connected to the wireless-enabled usage reporting device by wires or by wireless links. For example, a sensor in the cabin may detect the volume of music playing on the sound system. Another sensor may detect whether the onboard Bluetooth® transceiver is operating to relay a cellular call. These factors may be transmitted to the wireless-enabled usage reporting device to enable the computation of a risk score which is later transferred to the remote computer for viewing, analysis or other actions via the asset management application running on the remote computer.

The wireless-enabled usage reporting device may also include a starter interrupter (ignition kill switch), a payment reminder and/or an integrated back-up battery.

The starter interrupter may be configured to be automatically triggered by an asset management application executing on the remote computer or in response to a manual command input by a user at the remote computer, e.g. in response to a non-payment notification, a drop in the confidence score below a predetermined minimum threshold or a geo-fencing violation. The onboard wireless-enabled usage reporting device may also be used to disengage the starter interrupter when the late payment has been made or the confidence score rises above the threshold. Disengagement of the starter interrupter may be done automatically by the asset management application or manually by a user interacting with the asset management application.

The wireless-enabled usage reporting device may also send location data (a position fix in the form of GNSS-determined coordinates of latitude and longitude) when a payment is late to enable tracking of the vehicle. Periodic location updates may be provided by the wireless-enabled usage reporting device until the late payment is received, at which point location tracking may stop.

Payment reminders may be sent by the asset management application in the form of an automated e-mail, text message, SMS, pre-recorded voice message, etc. to an e-mail address or phone number associated with the user of the vehicle. Alternatively, the wireless-enabled usage reporting device may send the e-mail, text message, SMS, etc. directly to the e-mail address or phone number associated with the user of the vehicle. Sending of payment reminders may be automatically triggered when payment is not made on time or when the risk score falls below a predetermined threshold.

The wireless-enabled usage reporting device 100 may be hardwired or connected to a power source in the vehicle. The wireless-enabled usage reporting device 100 may furthermore include a back-up battery, e.g. a rechargeable lithium ion battery or equivalent, in case the power source in the vehicle fails or is disconnected. A power loss signal may be sent by the wireless-enabled usage reporting device when main power supply is disconnected as an anti-tamper measure. A message may also be automatically sent to the user indicating that the asset management is aware that the wireless-enabled usage reporting device has been disconnected and requesting that it be reconnected or that the vehicle be returned to an authorized service center to have it reconnected.

From the foregoing, it should be apparent that the confidence score may be sent to the remote computer in response to a command issued by the remote computer or it may be sent automatically based on any predefined criterion or set of predefined criteria, e.g. the confidence score may be sent periodically according to a predetermined schedule, randomly based on a random time selection algorithm, or based on other factor such as when the vehicle reaches a certain mileage, when the vehicle is located in a certain region, when there is a change in the confidence score, when there is a drop in the confidence score, etc.

The wireless-enabled usage reporting device protects the privacy of the user of the vehicle by computing a location-agnostic confidence score rather than storing or transmitting actual location data.

The processor of the wireless-enabled usage reporting device may use a microkernel as an operating system (OS) for executing one or more applications. The wireless-enabled usage reporting device application(s) may perform various calculations and computations on the raw data received via the sensors or via the data port. Processed data may then be stored (as a confidence score or information relating to the confidence score) and then transmitted wirelessly at suitable times to a remote asset management computer. The micro-kernel enables remote hot deployment of updates to the wireless-enabled usage reporting device application(s) without having to restart the wireless-enabled usage reporting device application(s), shut down or reboot the wireless-enabled usage reporting device.

The system depicted by way of example in FIG. 1 also includes a computer 200 communicatively connected to a data network 210 for receiving the confidence score or other data (representing information relating to the confidence score) from the wireless-enabled usage reporting devices 100. This computer 200 (or "asset management computer") may be a single computer connected to the data network, web-based server, server cluster, cloud service or any other distributed computing environment. The computer 200 may be a desktop personal computer, laptop, palmtop, notebook or any mobile device, wireless communications device, or portable electronic device like a tablet, smart phone, cell phone, personal digital assistant (PDA), etc. The computer 200 executes an asset management application (fleet management software) that receives the confidence score (and optionally other information relating to the confidence score) from the wireless-enabled usage reporting device and then displays and/or uses the confidence score in relation to a financing, leasing or insurance obligation associated with the vehicle. The risk score or confidence score is a quantitative measure of the risk associated with the financial obligation, i.e. the risk that the debtor does not pay (e.g. due to loss of employment or because he has skipped town with the vehicle) and/or because the vehicle is lost due to collision, theft, or other losses. The financial obligation may a financing obligation (car loan), a leasing obligation (lease), a rental obligation (which is essentially a short-term lease) or an insurance obligation (an insurance premium to be paid in exchange for an insurance policy). In each case, the confidence score quantifies the risk associated with the obligation, thus enabling the obligations to be bought and sold (the transfer of obligations from one creditor to another) or to dynamically price the obligations (i.e. dynamically adjust the insurance rate or the leasing rate).

The data network 210 shown in FIG. 1 may be the Internet or any other computer network. Data may be transmitted using TCP/IP or other known data transfer protocol. Data may be encrypted using any known cryptographic techniques, including private-key or public-key encryption.

The computer 200 comprises a memory 220 operatively coupled to a processor 230 for receiving the confidence score through a communication port (e.g. modem), and for displaying the confidence score and optionally also any other information based on the confidence score to indicate the risk associated with the financial obligation. Although the confidence score is computed by the wireless-enabled usage reporting device, the computer 200 may perform additional calculations or computations to determined a refined confidence score based on additional data provided to the remote computer.

In the system depicted by way of example in FIG. 2, the asset management application executing on the computer 200 may also be used for transferring financial obligations for vehicles from a first creditor to a second creditor. To perform this transfer, the computer displays a list of vehicles equipped with respective wireless-enabled usage reporting devices on a transfer screen with an indication of the risk associated with the financial obligation relating to each vehicle. The computer 200 receives input from a user input device (e.g. keyboard, mouse, touch-screen, microphone and voice recognition module or any combination thereof) to select which vehicles to transfer. The computer transfers the obligations relating to the vehicles that have been selected and displays a confirmation that the obligations have been transferred. The vehicles may be selected and transferred individually or as groups or lots. In the latter case, an aggregate risk index may be calculated by taking into consideration the risk associated with each vehicle in the group or lot.

FIG. 2 illustrates one example interface of the asset management application having vehicles and their make, model, year and VIN information displayed along with a risk score or confidence score. Each vehicle may have an optional photo or link to view more vehicle details, like mileage, maintenance history, accident history, etc. In this particular embodiment, which is presented solely by way of example, the risk score or confidence score is expressed as a percentage on a scale of 0 to 100 with 0 representing maximum risk (lowest confidence) and 100 representing minimum risk (highest confidence). Any other rating scale or system may be substituted, e.g. a scale of one to five stars, a rating of 1 to 10, a letter grade of A to F, words (e.g. excellent, good, fair, poor), abbreviations, acronyms, etc. Alternatively, the numerical score may be replaced by, or augmented with, a graphical representation. The graphical representation may include bars (as used in bar charts), color codes, special symbols, icons or any other suitable graphical designations.

As depicted in the embodiment of FIG. 2, a series of checkboxes is provided in this example to enable selection and transfer of the obligation for each individual vehicle in the list of vehicles, assuming that each vehicle is individually transferrable. Alternatively, menu items, buttons, toggles or other graphical interface elements may be provided to select the desired vehicles and to effect the transfer of the financial obligation for each of the selected vehicles. Graphical interface elements may be provided for a variety of other functions such as "select all items", "clear all selections", etc. Graphical interface elements may be provided to confirm the transfer, to edit creditor profiles, to change creditors, to cancel, etc. This example depicts how a confidence score is used to facilitate a transfer of financing obligations for car loans. The confidence score, as will be described below, may also be used in the context of leasing obligations and insurance obligations.

FIG. 3 depicts a flowchart that outlines main acts of a computer-implemented method of providing information about a vehicle equipped with an onboard wireless-enabled usage reporting device. The method comprises an act or operation 300 of receiving one or more parameters from the remote computer specifying what data to collect and use for computing the confidence score. Parameters specify what data to collect (speed, mileage, etc.) and/or what sensors to use (e.g. accelerometer for acceleration/deceleration) and/or what computations to perform (e.g. correlating actual location with workplace or residential addresses). The method then includes an act or operation 310 of computing a confidence score at the onboard wireless-enabled usage reporting device installed in the vehicle by using the usage data collected by the wireless-enabled usage reporting device. The confidence score is indicative of a risk associated with the financial obligation. Computing the confidence score (or risk score) may be done based on raw data collected by the wireless-enabled usage reporting device, based on preprocessed data created by the wireless-enabled usage reporting device, or a combination thereof. Preprocessed data means data that has been generated by the wireless-enabled usage reporting device by performing calculations, computations, filtering, or other processing on the raw data collected by the wireless-enabled usage reporting device. The method then includes an act or operation 320 of transferring the confidence score from the wireless-enabled usage reporting device to the remote computer. The method further comprises an act or operation 330 of presenting, e.g. displaying, information based on the confidence score to indicate the risk associated with the financial obligation for the vehicle. The act of presenting the information may be accomplished by displaying the information on a display screen or monitor connected to the computer. Alternatively, data representing the confidence score (or the "risk score") may be transmitted or relayed to any further remote computer or computing device in a wired or wireless network for presentation on any other remote computer or computing device. Presenting the information may involve the computer audibly speaking the results using a text-to-speech processor/module and a speaker or headphones.

In one implementation of this computer-implemented method, the confidence score (risk score) is computed based on historical location data obtained by the wireless-enabled usage reporting device indicating whether the vehicle is located at a place of employment associated with a user of the vehicle during predetermined workday hours. Alternatively or additionally, the confidence score may be based on acceleration and declaration data.

In one application, the confidence score may be used for evaluating financing, leasing or insurance obligations. In the implementation depicted by way of example in FIG. 4, the computer-implemented method entails an act or operation 340 of displaying a list of vehicles equipped with respective wireless-enabled usage reporting devices with an indication of the risk associated with the obligation relating to each vehicle, an act or operation 350 of receiving input to select which vehicle confidence scores to transfer, an act or operation 360 of transferring the confidence scores relating to the vehicles that have been selected, and an act or operation 370 of displaying a confirmation that the transfer has been accomplished. The displaying of the list of vehicles may be accomplished as shown by way of example in FIG. 2. The indication of risk is provided by the risk score or confidence score. Receiving input may, in this example, involve clicking checkboxes to select the items (i.e. the vehicles). Any other known selection technique may be employed such as clicking on the items, highlighting the items, or touching the items (for touch screen devices), etc. Transferring the obligations may entail triggering an actual electronic transaction, or merely the generation of a formal contract of sale or assignment to be subsequently executed by the parties either by printing out and signing paper copies or cryptographically by digital signature. Transferring the obligations may also involve automatically sending a communication to an official government vehicle registry to electronically effect the transfer of ownership.

The confidence score may also be used for evaluating the risk associated with a given insurance or leasing obligation. For example, this method dynamically adjusts the price or rate for car insurance or a car lease as a function of the confidence score. This method thus entails receiving the confidence score indicative of the risk associated with the usage of the vehicle and then dynamically adjusting the price (leasing rate or insurance rate) based on the confidence score.

In another implementation, the computer-implemented method further entails transmitting a vehicle disable signal to the wireless-enabled usage reporting device in response to the confidence score being below a predetermined minimal threshold. The signal may be automatically transmitted by the computer or the signal may be manually transmitted in response to user input. Thus, an aspect of the technology is automatically monitoring the risk for each vehicle. The automatic monitoring of risk is performed dynamically by the asset management application in response to the receipt of new data from the wireless-enabled usage reporting device. In response to the receipt of the new data, the asset management application on the computer recalculates the confidence score (risk score). If the confidence score falls below a predetermined minimum threshold, the asset management application will trigger a remedial action. This action may be the generating of an alert to owner/management of the asset or it may entail the sending of a communication to the wireless-enabled usage reporting device. The signal communicated to the wireless-enabled usage reporting device may be a signal to disable the vehicle or a signal to active the full-time location tracking. The action may also be a communication to the user of the vehicle advising of the change in confidence score and requesting that remedial action be taken by the user of the vehicle.

In another implementation, the computer-implemented method further entails receiving historical location data, identifying a potential change of address from the historical location data, and generating an address change alert for an account associated with the vehicle. The address change alert may be a pop-up dialog in the asset management application (or vehicle fleet management software application) that indicates to the user of the computer that the vehicle's location no longer appears to correlate with the address on file. In a variant, the asset management application executing on the computer may automatically suggest an update to the address, which may be accepted or rejected by the user of the asset management application.

The historical location data may be compared to a workplace address or a residential address or a billing address. The historical location data may be anonymized to protect the privacy of the user. For example, actual location coordinates may be erased from the memory after the processor of the wireless-enabled usage reporting device determines whether the location coordinates correspond to a residential address or a workplace address. The memory then stores the processed data only indicating whether the vehicle has been at the residential or workplace addresses as expected. Visits to specific locations using the vehicle would therefore not be recorded.

In another implementation, the asset management application may be configured to account for employees that travel as part of their employment, e.g. a repairman, a deliveryman or a traveling salesman. A calendar or schedule may be imported into the asset management application to provide locations and times for the user of the vehicle against which the application can verify the vehicle's actual location. In a variant, the user may communicate a holiday request to the asset management application to disable the scoring for when the user is on holidays.

In one implementation, the asset management application may have a web-based user extranet for vehicle users to update profile information, view their account, status, payment schedule, and any outstanding remedial actions, and optionally also the confidence score. The application may be configurable to permit the confidence score to be visible or not to the user when he or she logs into the web interface. The history of confidence scores may also be viewable. In one variant, a notice of default e-mailed to the vehicle user may provide a hyperlink back to the web interface to enable the vehicle user to obtain more information about the issue that triggered the notice of default and also possibly to redress the default. An extranet web portal may also be useful for authorized insurance companies to view the status of insured vehicles.

The real-time risk assessment provided by the confidence score determined by data reported by the wireless-enabled usage reporting devices enables the asset management application to configure and adjust the factors that determine the score. Analysis of the confidence score over time enables the application to determine an upward or downward trend for the risk, thereby enabling the asset management application to either sell the potentially high-risk obligations before they actually become high-risk obligations or to take remedial actions before the risk score becomes critical (e.g. send a letter or email to the user advising of a downward trend).

This technology also enables a new pricing model for the financed vehicles. A variable financing cost may be determined based on the variation in the risk score. For example, the leasing company or financing company may provide a variable price to the end user (customer). As an example, the leasing/financing company may provide a base rate of $300 per month minus a rebate equal to one dollar for every point of confidence score up to 100. In the first month, if the risk score is 80, the user would be charged $220. In the second month, if the risk score drops to 70, the user would be charged $230. This would incentivize the user to behave well in order to maximize his monthly rebate and thus to keep his monthly cost as low as possible. Another approach would be to charge a penalty for every point below a given level, e.g. one $1 per point below 80, and $2 per point below 70. Alternatively, there could be a schedule of costs such that the monthly cost is x if the confidence score is between 60-70, y if between 70-85, z if between 85-100, etc. Regardless of the specific implementation, this novel pricing paradigm would enable dynamic vehicle pricing as a function of risk scores calculated using the data from the wireless-enabled usage reporting devices.

This novel pricing paradigm may also be useful for car rental companies. A price for a rental of a vehicle is traditionally based on time and/or mileage plus the optional fueling charges and collision damage waiver charges. This novel pricing paradigm is made possible by employing a wireless-enabled usage reporting device in the vehicle just like in the leasing/financing scenario, either for frequent renters or for one-time renters. While the workplace location analysis would not be applicable for most rental scenarios, the wireless-enabled usage reporting device could still provide data to the asset management application to compute a risk score based on weather, location, time of day, routing, driving behavior (acceleration/deceleration), age, gender, type of vehicle, etc., to enable provide a variable pricing model. Thus, a 40-year-old female renting a family sedan to travel during daylight hours in good weather from one suburban location to another would yield a low risk score. The initial price would be lower than the standard price. On the other hand, an 18-year-old male renting a sports car to drive during rush hour in a snowstorm would result in a high risk score being calculated. The initial price would thus be high. However, the dynamic risk score would be recalculated in each case based on actual routing taken, changing weather conditions, and the driving behavior. It may be that the 40-year-old woman drives very fast, in which case her rental price will gradually increase from what was originally quoted, whereas the 18-year-old male might drive very slowly, in which case his rental price will gradually decrease from what was originally quoted. A renter profile may be established for repeat renters, thereby providing a starting-point risk score for the subsequent rental. For the purpose of this specification, a rental may be understood to be a short-term lease. Therefore, the concepts described for car leasing may be applicable to a car rental.

The dynamic, real-time risk scoring based on data from wireless-enabled usage reporting devices may also be useful for obtaining dynamic pricing for insurance premiums. The insurer can provide a variable premium that is a function of the risk score. Thus, both the financing/leasing/rental cost and the insurance cost for a given vehicle (or a fleet of vehicles) can be dynamically variable as a function of the risk score. From the foregoing, it should be appreciated that the risk score can take into account risks of non-payment (e.g. job loss) but also vehicle loss or damage risks (e.g. due to collision, theft, natural disaster, etc.)

In another implementation of this technology, a vehicle biometric system that authenticates the identity of the driver may provide a signal to the data port of the wireless-enabled usage reporting device to indicate that the driver is the proper user (the actual debtor of the monetary obligation for the vehicle).

In another related implementation, the user's mobile device may be used as a proxy for the user to track whether the user himself is driving (or riding in) the vehicle. This may be useful to know if there are restrictions imposed by the financing company or leasing company on who should use the vehicle or as a way to ascertain that the person in the vehicle traveling to the workplace location is actually the user responsible for the payments. In one embodiment, the wireless-enabled usage reporting device may be paired with the mobile device using a short-range wireless technology. In another embodiment, the wireless-enabled usage reporting device may have a sensor for sensing the pilot signal from the mobile device. In another embodiment, the mobile device may enable tracking of its location (by sending periodic location updates to the asset management application, which can then correlate the location of the mobile device with the location of the vehicle. Assuming the user is carrying his personal mobile device at all times, this can location check can indicate whether the user is in fact in the vehicle.

Although the technology is useful primarily for the leasing or financing of automobiles, this technology may also be used for the leasing or financing of other types of vehicles such as trucks, buses, recreational vehicles (RVs), tractors, motorcycles, ATV's, snowmobiles, boats, yachts, personal watercraft, ships, aircraft, etc. As will be readily appreciated, workplace location tracking and correlation would generally be inapplicable for these other types of vehicles.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable medium comprises instructions in code which when loaded into a memory and executed on a processor of a computer causes the computer to perform the acts of receiving data from the onboard wireless-enabled usage reporting device installed in the vehicle, computing a confidence score based on the data received from the wireless-enabled usage reporting device, the confidence score being indicative of a risk associated with the financing, leasing or insurance obligation, and displaying information based on the confidence score to indicate the risk associated with the financing, leasing or insurance obligation.

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

The foregoing description of the embodiments of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope of the invention. It is intended that the scope of the invention not be limited by this detailed description, but by the claims and the equivalents to the claims that are appended hereto.

What is claimed is:

1. A computer-implemented method of providing information about a financed, leased or insured vehicle having an onboard wireless-enabled usage reporting device for computing a risk associated with a financing, leasing or insurance obligation, the method comprising:
   providing a usage reporting device;
   wherein the usage reporting device comprises a vehicular data port, a global navigational satellite system (GNSS), a processor, a memory that is operatively coupled to the processor, a wireless transceiver, and a starter interrupter;
   wherein the usage reporting device is installed into a vehicle, such that the starter interrupter is configured to disable the vehicle from being driven;
   wirelessly receiving data by the usage reporting device from a remote computer to set parameters to be used by the usage reporting device to measure real-time vehicle usage;
   collecting location data using the GNSS;
   processing, by the processor the location data by comparing the location data with known locations of a residence and a place of employment of a user of the vehicle;
   computing on the usage reporting device a confidence score based on the parameters received from the remote computer;
   storing the confidence score in the memory of the usage reporting device, the confidence score being indicative of a risk associated with the financing, leasing or insurance obligation of the vehicle, wherein the confidence score is further based on a risk of non-payment due to loss of employment which is determined by the wireless-enabled usage reporting device by monitoring that the wireless-enabled usage reporting device is located at the residence or place of employment of a user of the vehicle during predetermined workday hours, wherein the confidence score is computed by assigning a high value when the location matches the place of employment, assigning a medium value when the location is consistently at a same location that is neither the place of employment or the residence, and assigning a lower value when the location matches the residence;
   automatically erasing the location data from the memory after computing the confidence score to protect a privacy of the user;
   wirelessly transferring the confidence score or information relating to the confidence score from the usage reporting device to the remote computer in response to a command from the remote computer or automatically based on a predefined criterion;
   generating an alert, on the remote computer, if the remote computer determines that the confidence score falls below a predetermined minimum threshold;
   transmitting a signal from the remote computer to the usage reporting device; and
   receiving the signal from the remote computer by the wireless-enabled usage reporting device;
   wherein in response to the usage reporting device receiving the signal from the remote computer, the usage reporting device takes remedial action, which comprises one or both of disabling the vehicle and activating full-time location tracking by the GNSS.

2. The computer-implemented method of claim 1, further comprising:
   displaying a list of vehicles equipped with respective wireless-enabled usage reporting devices on a transfer screen with an indication of the risk associated with the financing, leasing or insurance obligation relating to each vehicle;

receiving input to select which vehicles to transfer;

transferring the obligations relating to the vehicles that have been selected from a first entity selling the obligations to a second entity purchasing the obligations; and displaying a confirmation that the obligations have been transferred.

3. The computer-implemented method of claim 1, further comprising dynamically adjusting a leasing rate or an insurance rate based on the confidence score.

4. The computer-implemented method of claim 1, further comprising transmitting a vehicle disable signal to the wireless-enabled usage reporting device in response to the confidence score being below a predetermined minimal threshold.

5. The computer-implemented method of claim 1, further comprising receiving historical location data, identifying a potential change of address from the historical location data, and generating an address change alert for an account associated with the vehicle.

6. A method of using a non-transitory computer-readable medium comprising code which when stored in a memory and executed by a processor of an onboard wireless-enabled usage reporting device, the method comprising the steps:

providing a wireless-enabled usage reporting device;

wherein the usage reporting device comprises a vehicular data port, a global navigational satellite system (GNSS), a processor, a memory that is operatively coupled to the processor, a wireless transceiver, and a starter interrupter;

wherein the usage reporting device is installed into a vehicle, such that the starter interrupter is configured to disable the vehicle from being driven;

wirelessly receiving data from a remote computer to set parameters to be used by the wireless-enabled usage reporting device installed in the vehicle to measure real-time usage of the vehicle;

collecting location data using the GNSS in the wireless-enabled usage reporting device;

processing, by the processor in the wireless-enabled usage reporting device, the location data by comparing the location data with known locations of a residence and a place of employment of a user of the vehicle;

computing on the wireless-enabled usage reporting device a confidence score based on the parameters received from the remote computer and storing the confidence score in the wireless-enabled usage reporting device, the confidence score being indicative of a risk associated with the financing, leasing or insurance obligation of the vehicle, wherein the confidence score is also based on historical location data obtained by the wireless-enabled usage reporting device indicating whether the vehicle is located at the residence or place of employment associated with the user of the vehicle during predetermined workday hours in order to determine a non-payment risk due to loss of employment, wherein the confidence score is computed by assigning a high value when the location matches the place of employment, assigning a medium value when the location is consistently at a same location that is neither the place of employment or the residence, and assigning a lower value when the location matches the residence;

automatically erasing the location data from the memory after computing the confidence score to protect a privacy of the user;

wirelessly transferring the confidence score or information relating to the confidence score from the wireless-enabled usage reporting device to the remote computer;

receiving an alert, sent as a signal from the remote computer, if the remote computer determines that the confidence score falls below a predetermined minimum threshold and in response to the signal from the remote computer;

wherein in response to the wireless-enabled usage reporting device receiving the signal from the remote computer, taking remedial action by the wireless-enabled usage reporting device comprising one or both of disabling the vehicle and activating full-time location tracking by the GNSS; and authenticating the user using a vehicle biometric system that provides a signal to the wireless-enabled usage reporting device.

7. The method of claim 6, wherein the code for computing the confidence score comprises code for computing the confidence score based on acceleration and deceleration parameters.

8. The method of claim 6, further comprising the step:

transferring the confidence score from the wireless-enabled usage reporting device to the remote computer in response to a command from the remote computer.

9. The method of claim 6, further comprising the step:

transferring the confidence score from the wireless-enabled usage reporting device to the remote computer automatically based on a predefined criterion.

10. The computer-implemented method of claim 1 further comprising authenticating the user using a vehicle biometric system that provides a signal to the usage reporting device.

* * * * *